United States Patent [19]
Dent et al.

[11] Patent Number: 5,680,450
[45] Date of Patent: Oct. 21, 1997

[54] APPARATUS AND METHOD FOR CANCELING ACOUSTIC ECHOES INCLUDING NON-LINEAR DISTORTIONS IN LOUDSPEAKER TELEPHONES

[75] Inventors: Paul W. Dent, Pittsboro; Torbjörn W. Sölve, Cary, both of N.C.

[73] Assignee: Ericsson Inc., Research Triangle Park, N.C.

[21] Appl. No.: 393,711

[22] Filed: Feb. 24, 1995

[51] Int. Cl.[6] .................. H04M 9/08; H04R 29/00
[52] U.S. Cl. ............... 379/388; 379/406; 379/410; 381/59; 381/103
[58] Field of Search .................. 379/388, 389, 379/390, 420, 406, 410, 411, 409; 381/66, 59, 96, 98, 103; 370/32.1, 286, 289, 290, 291

[56] References Cited

U.S. PATENT DOCUMENTS

| | | | |
|---|---|---|---|
| 4,340,778 | 7/1982 | Cowans et al. | 179/1 D |
| 4,426,552 | 1/1984 | Cowans et al. | 381/71 |
| 4,468,641 | 8/1984 | Duttweiler et al. | 333/166 |
| 4,584,441 | 4/1986 | Chance et al. | 179/170.2 |
| 4,709,391 | 11/1987 | Kaizer et al. | 381/98 |
| 4,712,235 | 12/1987 | Jones, Jr. | 379/410 |
| 4,912,758 | 3/1990 | Arbel | 379/388 |
| 5,062,102 | 10/1991 | Taguchi | 370/32.1 |
| 5,084,865 | 1/1992 | Koike | 370/32.1 |
| 5,131,032 | 7/1992 | Esaki et al. | 379/410 |
| 5,193,112 | 3/1993 | Sano | 379/410 |
| 5,237,562 | 8/1993 | Fuji et al. | 370/32.1 |

(List continued on next page.)

FOREIGN PATENT DOCUMENTS

| | | |
|---|---|---|
| A60-102052 | 10/1985 | Japan . |
| A62-269451 | 5/1988 | Japan . |
| A01 189271 | 10/1989 | Japan . |

OTHER PUBLICATIONS

Rabiner et al., Pitch Period Estimation Using the Autocorrelation Function, Digital Processing of Speech Signals, *Bell Laboratories, Inc.*, Prentice Hall International, Inc., p. 150 (1978).

Park, Full–Duplex Speakerphone with Acoustic and Electric Echo–Canceller Utilizing the DSP56200 Cascadable Adaptive FIR Filter Chip, *Proc. of Midcon*, Technical Conference on Electronic and Electrical Technology, Dallas, TX, Sep. 11–13, 1990.

Murano et al., Echo Cancellation and Applications, *IEEE Communications Magazine*, p. 49 (1990).

Armbruster, High Quality Hands–Free Telephony Using Voice Switching Optimised with Echo Cancellation, *Signal Processing IV*: Theories and Applications, p. 495 (1988).

(List continued on next page.)

*Primary Examiner*—Krista M. Zele
*Assistant Examiner*—Devendra Kumar
*Attorney, Agent, or Firm*—Bell, Seltzer, Park & Gibson

[57] ABSTRACT

An echo canceling loudspeaker telephone includes a loudspeaker which produces a sound pressure wave in response to an input signal which is applied to an audio input thereof. This sound pressure wave includes a desired linear component which is a linear function of the input signal, and an undesired non-linear component which is a non-linear function of the input signal, and the sound pressure wave is transmitted along an acoustic path. A microphone is positioned in the acoustic path and converts the sound pressure wave into an output signal. An echo filter is responsive to the input signal and generates an estimated echo signal. This echo filter includes a loudspeaker model which generates an estimate of the sound pressure wave including an estimate of the linear component and an estimate of the non-linear component. This echo filter also includes an acoustic path model which generates an estimate of the acoustic path from the loudspeaker to the microphone. In addition, a subtractor subtracts the estimated echo signal from the output signal thereby reducing an echo portion of said sound signal.

31 Claims, 3 Drawing Sheets

U.S. PATENT DOCUMENTS

| | | | |
|---|---|---|---|
| 5,263,019 | 11/1993 | Chu | 370/32.1 |
| 5,263,020 | 11/1993 | Yatsuzuka et al. | 370/32.1 |
| 5,280,525 | 1/1994 | Wesel | 379/400 |
| 5,305,309 | 4/1994 | Chujo et al. | 370/32.1 |
| 5,307,405 | 4/1994 | Sih | 379/410 |
| 5,315,585 | 5/1994 | Iizuka et al. | 370/32.1 |
| 5,319,585 | 6/1994 | Amrany | 364/724.19 |
| 5,323,458 | 6/1994 | Park et al. | 379/388 |
| 5,323,459 | 6/1994 | Hirano | 379/388 |
| 5,408,530 | 4/1995 | Makino et al. | 379/392 |
| 5,414,766 | 5/1995 | Cannalire et al. | 379/410 |
| 5,438,625 | 8/1995 | Klippel | 381/96 |
| 5,471,528 | 11/1995 | Reesor | 379/388 |
| 5,481,615 | 1/1996 | Eatwell | 381/71 |
| 5,511,129 | 4/1996 | Craven et al. | 381/59 X |

OTHER PUBLICATIONS

Hsu et al., Acoustic Echo Cancellation for Loudspeaker Telephones, IEEE, Globecom, CH–2520–5, p. 1955 (1987).

Boll, Suppression of Acoustic Noise in Speech Using Spectral Subtraction, *IEEE Transactions on Acoustics, Speech, and Signal Processing*, vol. ASSP–27, No. 2 (1979).

Noble, Simulation of an Adaptive Echo Canceller for Carphone Hands–Free Units, *Rascal Research Limited*, UK, Session 2.4, p. 456.

Burnett et al., Echo Cancellation in Mobile Radio Environments, *IEEE*, pp. 7/1–4 (1988).

Park et al., Acoustic Echo Cancellation for Full–Duplex Voice Transsmision on Fading Channels, *Proc. of International mobile satellite Conference*, (1990).

Vries, Digital Compensation of Nonlinear Distortion in Loudspeakers, *IEEE*, p. I–165 (1993).

Roberts & Mullis, Least–Squares Filter Design, *Digital Signal Processing*, Addison–Wesley, Chapter 7, p. 229 (1987).

A.N. Birkett et al., Acoustic Echo Cancellation For Hands–Free Telephony Using Neural Networks, Proceedings of the 1994 IEEE Workshop on Neural Networks for Signal Processing, Sep. 6–8, 1994, Ermioni, Greece, pp. 249–258, XP000573386.

International Search Report, PCT/US96/02073, Jul. 16, 1996.

APPARATUS AND METHOD FOR CANCELING ACOUSTIC ECHOES INCLUDING NON-LINEAR DISTORTIONS IN LOUDSPEAKER TELEPHONES

This application is related to application Ser. No. 08/393, 726, U.S. Pat. No. 5,600,718, entitled "Apparatus and Method for Adaptively Precompensating for Loudspeaker Distortions" filed concurrently herewith and assigned to the assignee of the present invention, the disclosure of which is hereby incorporated in its entirety herein by reference.

FIELD OF THE INVENTION

This invention relates to the field of telephony, and more particularly to the suppression of echoes in loudspeaker telephones.

BACKGROUND OF THE INVENTION

A loudspeaker telephone system includes an output transducer, such as a loudspeaker, and an input transducer, such as a microphone. The loudspeaker produces sound pressure waves in response to an input signal received from the distant party which is representative of a desired sound pressure wave, and the microphone receives sound pressure waves to be converted to an output signal and transmitted to the distant party. Because the loudspeaker broadcasts sound pressure waves into the environment around the loudspeaker telephone, there is an acoustic path from the loudspeaker to the microphone which may result in an echo. Typically, this acoustic path includes a plurality of channels (representing a plurality of reflections) so that a plurality of echoes reach the microphone at different times.

If nothing is done to compensate for this acoustic path, sound pressure waves generated by the loudspeaker will echo back through the microphone to the distant user. In practice, this means that when the distant party speaks, the speech will be broadcast by the loudspeaker and then transmitted back making conversation difficult. Accordingly, there have been attempts in the art to reduce these echoes.

For example, the reference by Park et al. entitled "Acoustic Echo Cancellation for Full-Duplex Voice Transmission on Fading Channels" discusses the implementation of an adaptive acoustic echo canceler for a hands-free cellular telephone operating on a fading channel. *Proc. of International Mobile Satellite Conference*, Ottawa, Ontario, Canada, Jun. 18–20, 1990. The adaptive lattice structure, which is particularly known for faster convergence relative to the conventional tapped delay line (TDL) structure, is used in the initialization stage. After convergence, the lattice coefficients are converted into the coefficients for the TDL structure which can accommodate a larger number of taps in real-time operation due to its computational simplicity.

Other approaches to echo cancellation are discussed in the reference by Burnett et al. entitled "Echo Cancellation in Mobile Radio Environments", IEE Colloquium on Digitized Speech Communication via Mobile Radio, (Digest No. 139), p. 7/1–4, IEE, London, UK, Dec. 19, 1988. The conventional approach to providing echo attenuation is to use voice switched attenuators. As described therein, the half duplex channel enforced by such voice operated switches and the imperfections in the current voice activity detectors may lead to unnatural conversation. Another solution is to attenuate the echo by means of an adaptive echo canceler. As also described therein, this process may be imperfect, however, because any non-linearities in the echo path may cause harmonics which are inherently uncancelable. While microphones and amplifiers have more than adequate linearity specifications, loudspeakers usually have no linearity specification at all.

Notwithstanding the above mentioned references, there continues to exist a need in the art for improved loudspeaker telephone systems and methods which reduce echoes from the loudspeaker to the microphone.

SUMMARY OF THE INVENTION

It is therefor an object of the present invention to provide improved echo cancellation systems and methods for loudspeaker telephones.

It is another object of the present invention to provide improved echo cancellation systems and methods for mobile cellular radiotelephones.

These and other objects are provided according to the present invention by a loudspeaker telephone system comprising an echo filter, including a loudspeaker model, which generates an estimated echo signal. Most loudspeakers generate an actual sound pressure wave that differs from the desired sound pressure wave represented by the input signal. This difference is due, in part, to non-linear aspects of the loudspeaker. For example, the diaphragm of a loudspeaker may have a non-linear stress-strain curve, and the motion of the diaphragm may result in the delay modulation of higher frequencies by lower frequencies. Prior art echo cancelers known to applicants, however, fail to account for non-linear portions of the echo generated by the loudspeaker, meaning that these non-linear portions may be transmitted back to the distant party.

Accordingly, the estimated echo signal of the present invention includes non-linear components which correspond to the non-linear portions of the echo resulting from non-linear aspects of the loudspeaker. Therefore, when the estimated echo signal is subtracted from the output signal generated by the microphone, non-linear portions of the echo generated by the loudspeaker can be reduced. This echo filter also includes an acoustic path model which generates an estimate of the acoustic path from the loudspeaker to the microphone so that echo effects resulting from the acoustic path can be reduced.

In a preferred embodiment according to the present invention, an echo-canceling loudspeaker telephone includes an output transducer which produces a sound pressure wave in response to an input signal which is applied to an audio input thereof. This sound pressure wave includes a desired linear component which is a linear function of the input signal, and an undesired non-linear component which is a non-linear function of the input signal. This sound pressure wave is transmitted along an acoustic path, and an input transducer is positioned in the acoustic path to convert the sound pressure wave into an output signal.

An echo filter is responsive to the input signal and generates an estimated echo signal. The echo filter includes an output transducer model for generating an estimate of the sound pressure wave including an estimate of the linear component and an estimate of the non-linear component. The echo filter also includes an acoustic path model which generates an estimate of the acoustic path from the output transducer to the input transducer. A combiner combines the estimated echo signal and the output signal thereby reducing an echo portion of the output signal.

This echo canceling loudspeaker telephone system reduces echoes caused by the acoustic path from the output transducer to the input transducer which are a linear function of the input signal. This system also reduces portions of the echoes generated by the non-linear aspects of the loudspeaker which are a non-linear function of the input signal. Accordingly, this system reduces echoes in the output signal to a greater degree than would be possible without the output transducer model.

The echo-canceling loudspeaker telephone may also include an echo filter modifier responsive to the output signal, the input signal and the estimated echo signal for modifying the echo filter to further reduce the echo portion of the output signal. Accordingly, the system can adapt its operation for maximum echo reduction in a changing environment where the acoustic path varies. The echo filter modifier may include an output transducer model modifier which modifies the estimate of the sound pressure wave including the linear component and the non-linear component. The echo filter modifier may also include an acoustic path model modifier for improving the estimate of the acoustic path from the output transducer to the input transducer.

The acoustic path model is preferably a finite-impulse-response filter, and the echo filter is preferably a digital signal processor, allowing implementation with existing hardware. In addition, the output transducer model preferably includes means for performing a transformation of the input signal. This transformation is preferably an estimate of a transfer function of the output transducer means, and the transfer function preferably includes a non-linear component thereby providing a relatively precise approximation of the output transducer transfer function.

The non-linear component of the sound pressure wave represents one of a delay modulation of the output transducer and/or a diaphragm stress-strain curve of the output transducer. In a preferred embodiment, the output transducer is a loudspeaker, and the input transducer is a microphone. The output transducer model and the acoustic path model may be connected in series between the audio input and the combiner. In addition, the acoustic path model may include a first processing block for generating an estimate of the acoustic path for the non-linear component of the sound pressure wave and a second processing block for generating an estimate of the acoustic path for the linear component of the sound pressure wave. In addition, the combiner may be a subtractor which subtracts the estimated echo signal from the output signal.

The foregoing and other objects and aspects of the present invention are explained in detail in the drawings and specification set forth below.

DETAILED DESCRIPTION OF THE INVENTION

The present invention will now be described more fully hereinafter with reference to the accompanying drawings, in which preferred embodiments of the present invention are shown. This invention may, however, be embodied in many different forms and should not be construed as limited to the embodiment set forth herein; rather, these embodiments are provided so that this disclosure will be thorough and complete, and will fully convey the scope of the invention to those skilled in the art. Like numbers refer to like elements throughout.

Figure 1:
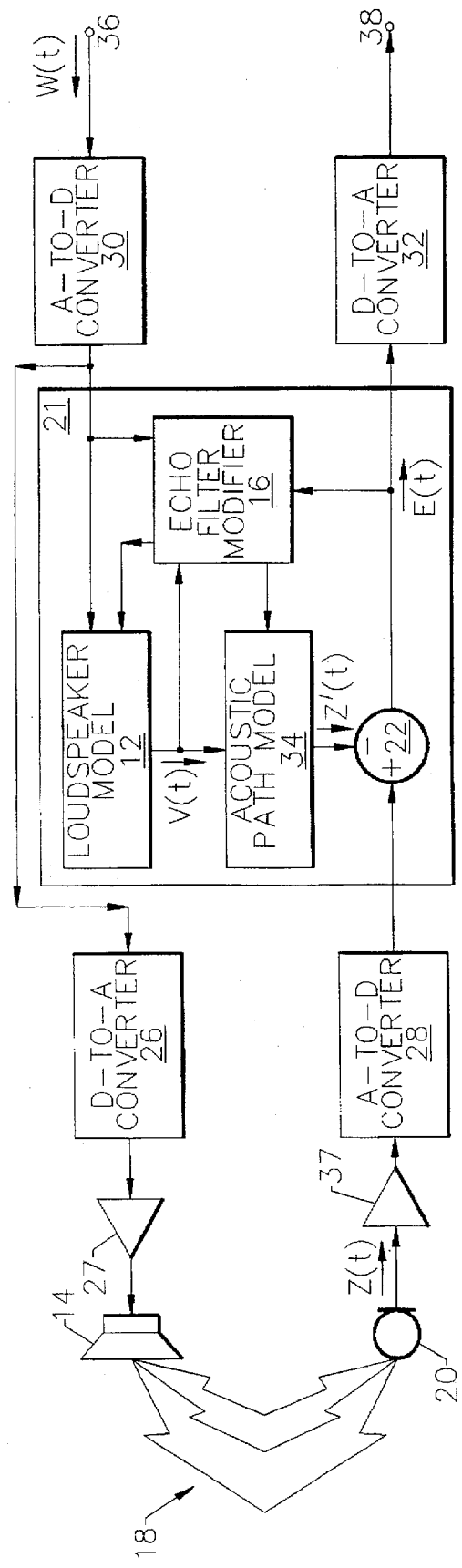
FIG. 1 is a schematic diagram of an echo canceling loudspeaker telephone system including a loudspeaker, a microphone, and an echo filter including a model of the loudspeaker and a model of the acoustic path arranged in series, according to the present invention.

The echo cancellation system illustrated in FIG. 1 can be implemented in a loudspeaker telephone such as a hands-free loudspeaker cellular radiotelephone for use in an automobile. When implemented as a hands-free cellular telephone, speech signals received from a distant party are transmitted from a cellular base station (not shown), received by the transceiver of the cellular phone (not shown), and applied to input node 36 as input waveform W(t).

As shown in FIG. 1, the waveform W(t) is applied in an analog format at node 36, and converted to a digital format by A-to-D converter 30 for use by the loudspeaker model 12. D-to-A converter 26 is then used to convert the waveform to an analog format. The analog signal is amplified by amplifier 27, and a sound pressure wave representative of the speech of the distant party is broadcast by an output transducer such as loudspeaker 14. Accordingly, the radiotelephone user hears sound pressure waveforms which are representative of the speech of the distant party. Alternately, the analog signal W(t) at node 36 can be applied directly to amplifier 27. If the waveform W(t) is applied in a digital format at node 36, then it can be applied directly to the loudspeaker model and the D-to-A converter 26.

The sound pressure wave, however, is also broadcast along the acoustic path 18 which can include multiple channels. A channel is a reflection (or echo) path from the loudspeaker to the microphone. As a result, echoes of the sound pressure wave are received by an input transducer such as microphone 20. It is therefor desirable to reduce these echoes in the output signal Z(t) generated by the microphone 20 so that the distant party is not confused by delayed echoes of his own speech. This echo reduction is preferably achieved by using an echo filter implemented as digital signal processor ("DSP") 21 to generate an estimated echo signal, and to subtract this estimated echo signal from the microphone 20 output signal. Accordingly, amplifier 37 and A-to-D converter 28 can be used to convert the output waveform Z(t) to an appropriate digital format.

The echo filter is preferably implemented as a digital signal processor ("DSP") 21 which generates an estimated echo signal Z'(t) in response to the input waveform W(t). If the input waveform is applied in an analog format, A-to-D converter 30 can be used to convert the waveform to a digital format. (If W(t) is applied in a digital format, D-to-A converter 30 is not needed.) The input waveform is then applied to loudspeaker model 12 within the echo filter which includes a transfer function representative of the loudspeaker. This transfer function models both linear and non-linear aspects of the loudspeaker 14. The output from the loudspeaker model 12 is applied to the acoustic path model 34, implemented within the echo filter, which represents the acoustic path 18. The acoustic path model 34 is preferably implemented as an adaptive finite-impulse-response ("FIR") filter. Accordingly, the estimated echo signal Z'(t) from the acoustic path model 34 can closely approximate the echo from the loudspeaker received by the microphone.

Adaptive filters used in echo cancellation are discussed, for example, in U.S. Pat. No. 5,237,562 to Fujii et al., entitled "*Echo Path Transition Detection.*" Other echo cancellers including adaptive echo estimation or including a finite impulse response filter are respectively discussed in U.S. Pat. No. 5,131,032 to Esaki et al., entitled "*Echo Canceller and Communication Apparatus Employing the Same,*" and U.S. Pat. No. 5,084,865 to Koike, entitled "*Echo Canceller Having FIR and IIR Filters for Cancelling Long Tail Echoes.*" Each of the three above cited references are hereby incorporated in their entirety herein by reference.

The estimated echo signal $Z'(t)$ is combined with the microphone 20 output signal $Z(t)$ by a subtractor 22, also implemented within the DSP, which subtracts the estimated echo signal from the output signal. Accordingly, only sounds generated at the radiotelephone will be transmitted to the distant party. In a cellular radiotelephone application, the output waveform $Z(t)$ (minus the estimated echo signal $Z'(t)$) at output node 38 is applied to the radiotelephone transceiver (not shown) and transmitted to a remote cellular base station (not shown). If the transceiver requires an analog output waveform, D-to-A converter 32 can be used to convert the signal to an analog format. If the transceiver requires a digital waveform, D-to-A converter 32 is not needed.

The echo filter also preferably includes an echo filter modifier 16 which modifies the operation of the echo filter allowing further reduction of the echo portion of the output signal. The echo filter modifier monitors the various signals within the echo filter and modifies the operation of the loudspeaker model and the acoustic path model to further reduce echoes in the output waveform. Accordingly, the echo filter can modify its operation to accommodate changes in the acoustic path as well as aging of the system.

Figure 2:
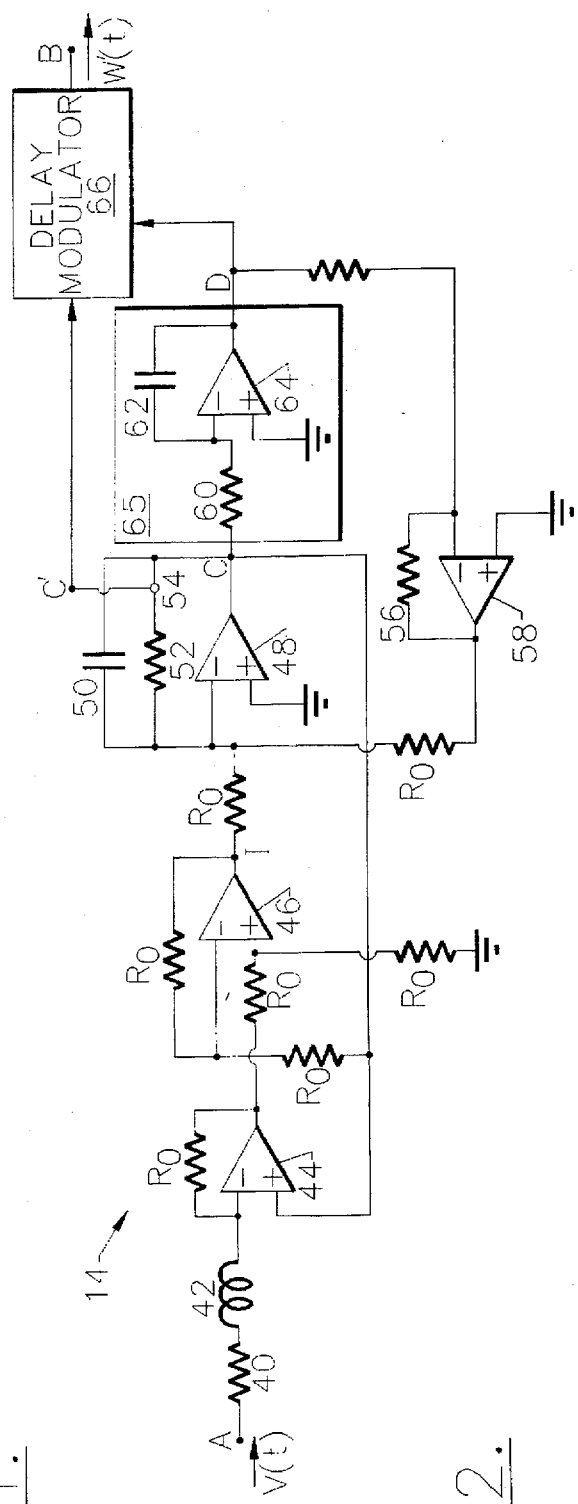
FIG. 2 is a schematic diagram representing a model of the electrical characteristics of the loudspeaker shown in FIG. 1.

FIG. 2 shows an analog model of the electrical characteristics of an output transducer such as loudspeaker 14. An electrical input signal is applied at input node A to create a current through the loudspeaker coil. The current flow is opposed by the coil resistance 40 and coil inductance 42, as well as the back EMF induced by the coil velocity in the magnetic field. By suitable choice of units and scaling in the model, the voltage at node C may be equal to the back-EMF as well as being representative of the coil velocity. The back EMF from node C is presented in opposition to the drive voltage at input A by connection to the positive input of differencing operational amplifier 44. The output of amplifier 44 is the sum of the back EMF from node C and a term proportional to the current in the coil. Amplifier 46 subtracts the back EMF to yield a voltage representing the current in the coil only, and by suitable choice of arbitrary units, this voltage also represents the force the coil exerts on the loudspeaker diaphragm by the current reacting with the magnetic field produced by the loudspeaker magnet. As will be understood by those having skill in the art, the term diaphragm is used throughout this specification in its broadest sense so as to include a planar diaphragm, a dome shaped diaphragm, or a cone shaped diaphragm.

The force causes an acceleration of the loudspeaker diaphragm to a certain velocity which is resisted by the diaphragm's mass or inertia and by air resistance encountered. Operational amplifier 48 has a feedback capacitor 50 representing the diaphragm's mass and a feedback resistor 52, which might be non-linear, representing the air resistance acting against the diaphragm. The current flow through resistor 52 opposes the accelerating force and relates to the air pressure wave created by the diaphragm movement. Current sensor 54 generates a signal at node C' which represents this air pressure wave created by the diaphragm movement.

The pressure wave, however, emanates from a moving object, the diaphragm. When the diaphragm is instantaneously displaced to the front of the loudspeaker, it will be closer to a listener in front of the loudspeaker. Accordingly, sound waves will reach the listener with a shorter time delay than when the diaphragm is displaced toward the rear of the loudspeaker. Diaphragm displacements occur with greatest amplitude at low frequencies giving rise to the non-linear phenomenon of delay modulation (also known as phase modulation) of higher frequencies by lower frequencies. A signal representative of the diaphragm displacement is generated at node D by resistance 60, capacitance 62, and operational amplifier 64, which together make up integrator 65. Thus the pressure wave signal from the diaphragm generated at node C' is subjected to delay modulation produced by delay modulator 66 according to the diaphragm displacement signal generated at node D in order to produce the net sound pressure waveform at output node B that is transmitted to a listener.

The diaphragm displacement signal generated at node D is also needed to model the diaphragm spring restoring force that opposes the force exerted by the coil which is represented by the coil force signal generated by operational amplifier 46. The diaphragm spring is expected to exhibit a non-linear stress-strain curve modelled by the non-linear resistor 56. Operational amplifier 58, having non-linear resistor 56 in its feedback path, converts the displacement-related signal generated at node D to a restoring force which adds in opposition to the coil force signal at the input of operational amplifier 48. The resistors labeled $R_o$ may be equal to 1 ohm.

Thus, with appropriate choice of parameters and scalings in the above-described model of FIG. 2, the sound pressure wave generated at loudspeaker output node B can be predicted from the electrical signal applied to the loudspeaker input node A.

According to a preferred embodiment of the present invention, a loudspeaker model 12 including an estimation of loudspeaker non-linearities is included in the echo cancellation path of a full-duplex echo canceler in order to improve prediction of echoes that will be received back into the microphone 20 of a loudspeaker telephone. FIG. 1 shows inclusion of this model 12 into the block diagram of an echo canceler. An input speech waveform W(t) is received from the telephone system, and after suitable processing is applied to input node 36 and then loudspeaker 14. In a mobile phone system, such processing can include demodulation of a digitally-modulated radio signal, error correction decoding and speech decoding using, for example, a Residually Excited Linear Prediction ("RELP") or Vector Set Excited Linear Prediction ("VSELP") speech synthesizer. The waveform W(t) is the output of such processing, and may be in a digital format which is more suitable for processing by the echo canceler of the present invention. In this case, W(t) can be converted by D-to-A converter 26 and amplified by amplifier 27 before being applied to the speaker 14. The loudspeaker 14 broadcasts a sound pressure wave including non-linear distortion components, into the environment, and some of this sound pressure wave reaches microphone 20 by a variety of delayed channels along acoustic path 18. The microphone output waveform Z(t) is amplified by amplifier 37 and preferably sampled and A-to-D converted using A-to-D converter 28 to produce digitized samples of waveform Z(t). The original speech waveform W(t) is also processed using a loudspeaker model 12 and a model 34 of the multi-path acoustic coupling from loudspeaker to microphone, in order to produce an estimate Z'(t) of the microphone output signal Z(t). This is subtracted by subtractor 22 to leave a residual echo signal E(t) which is desired to be reduced.

If the near-end party is speaking, E(t) also contains near-end speech which is transmitted to the telephone network. The signal E(t), if in digital form, may be converted to analog form if necessary for onward transmission using D-to-A convertor 32. In a mobile cellular phone system, other processing such as RELP or VSELP speech coding, for example, can be used to produce a reduced bit-rate representation of the signal, error correction coding, and digital modulation on a radio frequency carrier.

An echo filter modifier 16 is used to update the coefficients of the acoustic path model 34 so as to obtain the least mean square value of the residual E(t). This is done by computing the cross-correlation between the waveform V(t) at the input of the linear channel model and the residual error E(t), and determining by how much each coefficient shall be changed to produce better cancellation. For example, if E(t) shows strong correlation with V(t) delayed by 23 samples, then the FIR coefficient applied to delay tap number 23 of the filter is adjusted to remove this correlated component from the output of subtractor 22. This process will be known to those having skill in the art and will not be described further here. The inclusion of the transducer model 12 to produce the waveform V(t), however, permits improved echo cancellation.

Any modification of either the loudspeaker model 12 or the acoustic path model 34 is preferably done when only the distant party is speaking. This condition allows a comparison of the input waveform W(t) to the residual echo without the interference of other sounds not generated by the loudspeaker. In one embodiment, this condition is determined by comparing the signal strength into the loudspeaker to the signal strength out of the microphone. A device that determines when the microphone signal is substantially derived from acoustic feedback is discussed, for example, in U.S. Pat. No. 5,263,019 to Chu, entitled *"Method and Apparatus for Estimating the Level of Acoustic Feedback Between a Loudspeaker and Microphone,"* the disclosure of which is hereby incorporated in its entirety herein by reference.

The invention may also include the use of the echo filter modifier 16 to adjust the parameters of the loudspeaker model 12 in order to further improve echo cancellation by removing residual distortion components that are not modeled by the linear FIR filter of the acoustic path model 34.

The waveform V(t) is calculated by the transducer model 12 from the waveform W(t). These waveforms are assumed to be represented by numerical samples . . . , W(i−1), W(i), W(i+1), . . . , and . . . , V(i−1), V(i), V(i+1), . . . . Likewise, the internal waveforms at nodes B, C, C', D, and I, shown in FIG. 2, are represented by discrete-time samples. The computation of the output waveform samples W(i) proceeds using the following equations:

$$I(i)=(A(i)+Y*I(i-1)-C(i-1))/(R+Y) \quad (1)$$

$$C(i)=C(i-1)+(G(D(i-1))-U(i-1)-I(i))/X \quad (2)$$

$$D(i)=D(i-1)-C(i) \quad (3)$$

$$U(i)=F(C(i)) \quad (4)$$

and $$W(i)=U(i)-0.5(U(i+1)-U(i-1))*D(i)*dT \quad (5)$$

where

Y is equal to the coil inductance L divided by the sample time spacing;

R is the coil resistance;

G is a non-linear function representing the diaphragm spring stress-strain relationship;

X represents the diaphragm mass parameter 52 divided by the sample time spacing; and F is a non-linear function representing the conversion of diaphragm velocity waveform C(i) to a sound pressure waveform U(i).

Equation (5) expresses delay modulation of the pressure wave U(i) which results from the motion of the diaphragm. This calculation is done by interpolating between samples U(i) using the derivative 0.5(U(i+1)−U(i−1)), by an amount depending on the diaphragm instantaneous displacement D(i) and a scaling factor dT representing the amount of delay modulation.

For example, if the sample rate is 8 k samples per second, samples . . . , (i−1), (i), (i+1), . . . are 125 μS apart. In 125 μS sound travels approximately 1.5 inches, so if the diaphragm displacement D were computed by integrator 65 in units of 1.5 inches, D=1 would signify one whole sample delay. The formula would then be changed to:

$$W(i)=U(i-1) \text{ for } D(i)=1$$

or $$W(i)=U(i+1) \text{ for } D(i)=-1$$

Since D is expected to be less than 0.5 however, equation (5) is more appropriate.

In the equations discussed above, the sign of the delay modulation has been arbitrarily assumed. It may be necessary to flip the sign of the delay modulation, which is one of the reasons for introducing the scaling factor dT, which can be positive or negative. The other reason to include the scaling factor is to permit D(i) to be computed in units other than 1.5 inches. The units can be chosen to be suitable for computing the function G(D(i)).

It can be acceptable to assume a linear conversion of diaphragm velocity to pressure, in which case C(i)=U(i). An arbitrary scaling here represents the fact that no particular units have been assumed for defining the conversion of electrical signals to sound waves. The following four equations then result:

$$I(i)=(A(i)+Y*I(i-1)-C(i-1))/(R+Y) \quad (6)$$

$$C(i)=(G(D(i-1))+X*C(i-1)-I(i))/(1+X) \quad (7)$$

$$D(i)=D(i-1)-C(i) \quad (8)$$

and $$W(i)=C(i)-0.5(C(i+1)-C(i-1))*D(i)*dT. \quad (9)$$

There are now only two non-linear effects modelled in these equations. These non-linear effects are the delay modulation, which is represented by the addition of an amount dT times a distortion waveform which is the product of the derivative and the integral of C(t); and the diaphragm stress-strain curve which is represented by a function G(t).

G(t) can be partitioned into a linear stress-strain curve of slope $G_0$ plus the non-linear remainder $G'(D)=G(D)-G_0*D$. The purpose of this is to enable equation (7) to be replaced with the following small-signal version:

$$C(i)=C(i-1)+(G_0*D(i-1)-U(i-1)-I(i))/X. \quad (10)$$

This equation can then be used with equations (6) and (8) to predict small-signal behavior of the loudspeaker. The small signal and linear parameters can then be determined for the loudspeaker by measurement.

The determination of the coil resistance 40 and inductance 42 parameters R and Y will be understood by one having skill in the art, while the diaphragm mass and linear part of the diaphragm stress-strain curve $G_0$ can be determined by measuring the diaphragm's mechanical resonant frequency and Q factor when the speaker is in its intended housing.

The small-signal parameters are then fixed; and the non-linear parameters, dT representing delay modulation and G' representing the non-linear part of the stress-strain curve, may be determined by large signal measurements. Delay modulation may be determined, for example, by observing with a spectrum analyzer the intermodulation produced on a two-tone test between a low frequency sine wave signal that causes large diaphragm displacements and a high frequency sine wave signal that is most sensitive to phase modulation by the low-frequency diaphragm displacements.

The non-linear part of the stress-strain curve can be obtained by using a spectrum analyzer to observe the harmonic distortion of a large, low-frequency, sine wave signal as a function of amplitude and finding a function G' by trial and error that explains it. The function can be represented in a numerical signal processor by a look-up table. Alternatively, this curve can be directly determined by physical measurements of force or DC current required to displace the diaphragm a measured amount. The invention may include the provision of a diaphragm displacement or movement sensor for the purpose of assisting in real-time determination or adaptive updating of model parameters.

In practice, a stress-strain curve G' may be assumed to be known apart from a scaling factor for a particular loudspeaker. Likewise, it may be assumed that the linear model parameters resulting in particular diaphragm mechanical resonances are well known for a particular loudspeaker size and make. Small errors in small-signal parameters that effect small-signal frequency response are not of great consequence as any system is assumed to have some ability to adapt linear frequency responses to compensate. For example, a manual equalizer or tone control may be used.

In a loudspeaker telephone, the linear frequency response from the loudspeaker 14 to the microphone 20 across acoustic path 18 includes reflections from nearby objects and possible room resonances, generally referred to by the term "environment". Accordingly, this response can be modeled by an acoustic path model 34 including a complex linear FIR filter. The echo or ring-around, however, is imperfectly modeled due to the non-linear effects discussed above which are not modeled by the linear FIR filter thereby resulting in imperfect echo cancellation. Using the non-linear echo cancellation system shown in FIG. 1, however, the channel from electrical input, to the loudspeaker amplifier, to the loudspeaker, across the acoustic path, to the microphone, and through the microphone amplifier is more accurately matched by the combination of loudspeaker model 12 and acoustic path model 34, thereby providing better echo cancellation. It is now described, with the aid of FIG. 1 and the equations discussed above, how the non-linear transducer model parameters can be adapted in real time to continuously reduce residual uncancelled echo-distortion residuals.

Referring to equation (9), it can be seen that the output V(t) of loudspeaker model 12 includes the sum of two waveforms, C(i) and B(i)=0.5(C(i+1)-C(i-1))*D(i), the latter being scaled by -dT. Since the FIR filter 34 discussed above is linear, its output is the sum of two waveforms obtained by filtering C(i) and B(i) independently, and adding the filtered waveforms with a scaling of -dT for the filtered B(i) output.

Since waveforms C(t) and D(t) are calculable from W(t), B(i) can be precalculated and C(t) and B(t) can be independently filtered to obtain samples of waveforms $Z_1(t)$ and $Z_2(t)$ respectively. Z'(t) will be equal to $Z_1(t)-dT*Z_2(t)$, and the value of dT can be computed to increase the echo cancellation. That is, dT can be computed to reduce the mean square value of the residual waveform E(t), in which the sum of the squares of:

$$E(i)=Z(i)-Z_1(i)+dT*Z_2(i) \text{ is reduced.}$$

This value of dT is given by the equation:

$$dT = -\frac{1}{N}\Sigma(Z(i)*(Z(i)-Z_1(i))),$$

where $Z_2(i)$ is correlated with $Z(i)-Z_1(i)$, for i=1 to N samples.

The amount ALPHA of the $Z_1(t)$ waveform that is combined with BETA of the $Z_2(t)$ waveform can be jointly optimized to obtain:

$$\text{ALPHA} = \frac{de-bf}{ad-bc} \;;\; \text{BETA} = \frac{af-ce}{ad-bc}$$

where:

$$a = \sum_i [Z_1^2(i)]$$

$$d = \sum_i [Z_2^2(i)]$$

$$b = c = \sum_i [Z_1(i)*Z_2(i)]$$

$$e = \sum_i [Z_1(i)*Z(i)]$$

$$f = \sum_i [Z_2(i)*Z(i)]$$

Since changing both the amount of $Z_1$ and $Z_2$ is approximately equivalent to scaling the FIR coefficients, the values ALPHA and BETA can be implemented by an overall scaling of the FIR coefficients by multiplication with ALPHA, and by setting: dT=-BETA/ALPHA.

Extra degrees of freedom to reduce the residual E(t) can be obtained by using separate adaptively optimized FIR filters for filtering the B(t) waveform and the C(t) waveform to obtain two waveforms $Z_1(t)$ and $Z_2(t)$ in dependence on separate sets of FIR coefficients. However, there is no physical basis for expecting the coefficient sets to differ other than by a scaling -dT. In problems of the type considered here, it is generally found that models based on physical reality are the most economic in terms of complexity. Complexity may sometimes be sacrificed, however, in favor of quick implementations through the use of existing adaptive FIR algorithms that are already programmed. An echo cancellation system with separate FIR filters $34_{A1}$ and $34_{B1}$ is illustrated in FIG. 3.

Figure 3:
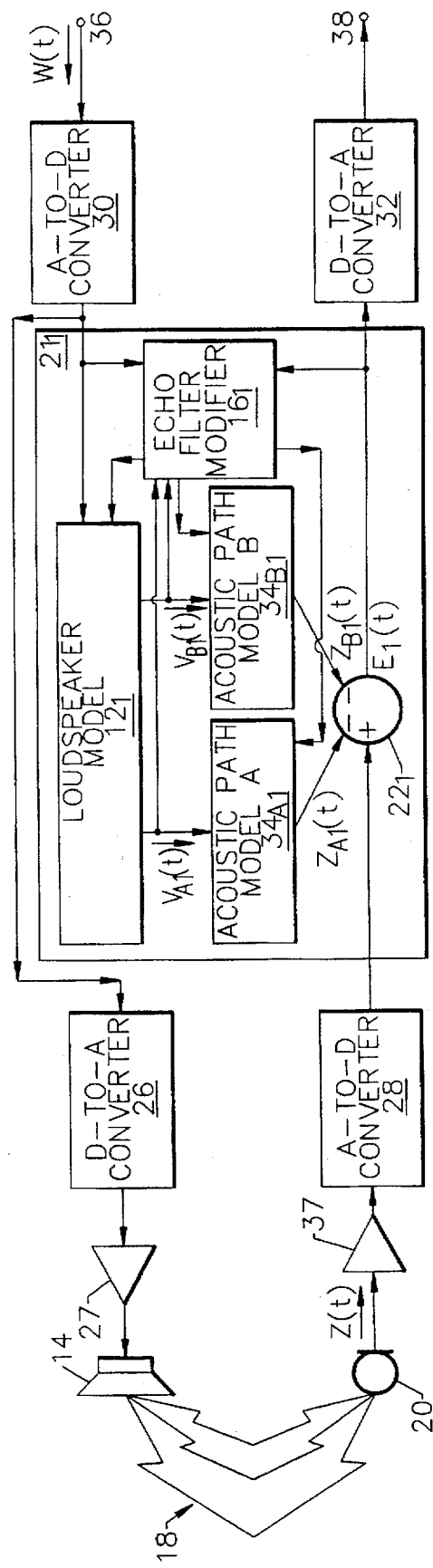
FIG. 3 is a schematic diagram of an echo canceling loudspeaker telephone system including a loudspeaker, a microphone, and an echo filter including a model of the loudspeaker in series with two separate filters used to model the acoustic path, according to the present invention.

The transducer model $12_1$ in FIG. 3 produces two output waveforms, a non-delay modulated waveform C(t) (shown as $V_{A1}(t)$) and a distortion waveform B(t) (shown as $V_{B1}(t)$). C(t) and B(t) pass through separate acoustic path models $34_{A1}$ and $34_{B1}$, each comprising an FIR filter, the coefficients of which are all adapted by echo filter modifier $16_1$ in order to reduce the residual waveform $E_1(t)$ out of subtractor $22_1$. Those having skill in the art will be able to contrive other variations in this arrangement. For example, the two FIR filters can be separate for part of the path and then summed into a common FIR filter for the remainder of the path. The foregoing embodiment of FIG. 3, using coefficients ALPHA and BETA, is in fact an extreme version of this principle in which the separate parts of the filters are reduced to single taps of weight ALPHA and BETA, respectively. However, all the values of ALPHA, BETA, and the coefficients of the common part of the FIR filter may be jointly optimized instead of optimizing ALPHA and BETA only while accepting the previously optimized FIR coefficients. This is a matter of design implementation and a complexity trade off that can be made by persons having skill in the art while adhering to the basic principles of the non-linear echo cancellation.

An additional filter (not shown) may be included before loudspeaker models 12 and $12_1$ of FIGS. 1 and 3. The purpose of this filter is to model the anti-aliasing filter contained in D-to-A converter 26. This filter has some effect on the waveform driving the loudspeaker, and so in the interests of driving the loudspeaker models 12 and $12_1$ with the same waveform that drives the real loudspeaker, a model of this filter can be included. A model of the frequency response of the speaker amplifier 27 can also be included here. This filter should not need to be adapted and can be set in the factory to model the anti-aliasing filter and audio amplifier responses. An anti-aliasing filter corresponding to the signal path from the microphone input 20 through the A-to-D convertor 28 can be adequately modelled by the FIR filter or filters used to model the acoustic path.

The technique described above takes care of one of the non-linear distortion mechanisms of the loudspeaker. The non-linearity, caused by the diaphragm spring, can be updated in a similar way. The diaphragm spring non-linearity is modelled as a polynomial such as:

$$G_0*D(t)+G_1*D(t)^2+G_2*D(t)^3 \ldots$$

Each of the second, third and higher order distortion waveforms from amplifier 58 of FIG. 2 enters amplifier 48 and is subjected to a certain frequency response before emerging at output B. The distortion waveforms are also further distorted, but these higher order effects can be neglected without significantly affecting the model.

The frequency response to which the cubic distortion term, for example, is subjected can be represented by an FIR filter having tap weights $t_0, t_1, t_2, t_3, \ldots$, etc. That is, the output distortion waveform will be:

$$t_0G_2*D^3(i)+t_1*G_2*D^3(i-1)+t_2*G_2*D^3(i-2) \ldots$$

This waveform then reaches the microphone through the acoustic path 18 and is also passed through the FIR filter of acoustic path model 34 to reduce the echo.

Since the FIR filter of acoustic path model 34 is linear, each of the terms in the series listed above may be filtered independently and added. Since each of the terms is in fact just a delayed version of the foregoing term, there is really only one waveform to pass through the FIR filter. This waveform is:

$$\ldots, D^3(i-1), D^3(i), D^3(i+1), \ldots$$

The resulting filtered waveform is denoted by:

$$\ldots, Z_3(i-1), Z_3(i), Z_3(i+1), \ldots$$

This waveform is then subjected to the FIR filter defined by weights, $T_0, T_1, T_2, \ldots$, and subtracted from the residual echo to reduce it. The tap coefficients, $T_0, T_1, T_2, \ldots$, which most effectively reduce the residual echo can be found by the same technique used to find the tap weights for the FIR filter of acoustic path model 34 to reduce the residual by subtracting weighted delayed copies of the W(t) waveform. The optimum taps, $T_0, T_1, T_2, \ldots$, differ from the known frequency response of the model, $t_0, t_1, t_2, \ldots$, only by the factor $G_2$. Therefore, an updated value of the distortion coefficient $G_2$ can be found. In the same way, any polynomial coefficient of the diaphragm spring non-linearity can be assigned an updated value which reduces non-linear echo residuals.

As discussed above with regard to FIG. 1, the echo filter according to the present invention can be implemented as a digital signal processor 21 including a loudspeaker model 12, an acoustic path model 34, a subtractor 22, and an echo filter modifier 16. In this embodiment, the loudspeaker model and the acoustic path model each comprise a single processing block, and these processing blocks are arranged in series. The processing functions, however, can have other arrangements.

For example, the acoustic path model can be broken down into two processing blocks such as acoustic path model A $34_{A1}$ and acoustic path model B $34_{B1}$ within DSP $21_1$, as shown in FIG. 3. In this embodiment, the loudspeaker model $12_1$ has a first output $V_{A1}(t)$ which models the non-linear aspects of the loudspeaker 14 output, and a second output $V_{B1}(t)$ which models the linear aspects of the loudspeaker output. Accordingly, the acoustic path model A $34_{A1}$ models the acoustic path for the non-linear aspects of the sound pressure wave, and the acoustic path model B $34_{B1}$ models the acoustic path for the linear aspects of the sound pressure wave. Each of the acoustic path models can be independently modified in order to provide a more accurate estimates of each portion of the echo signal.

Accordingly, if the acoustic path 18 behaves differently with regard to the linear and non-linear aspects of the sound pressure wave, the separate acoustic path model processing blocks can accommodate this difference. This arrangement allows flexibility with regard to the parameters used to model the acoustic path 18 as well as flexibility with regard to the modification of these parameters by echo filter modifier $16_1$. FIG. 3 shows the subtraction of the non-linear echo estimate $Z_{A1}$ and the linear echo estimate $Z_{B1}$ by subtractor $22_1$ in a single processing operation. These echo estimates may alternately be performed separately by multiple subtractors, as will be understood by those having skill in the art.

Figure 4:
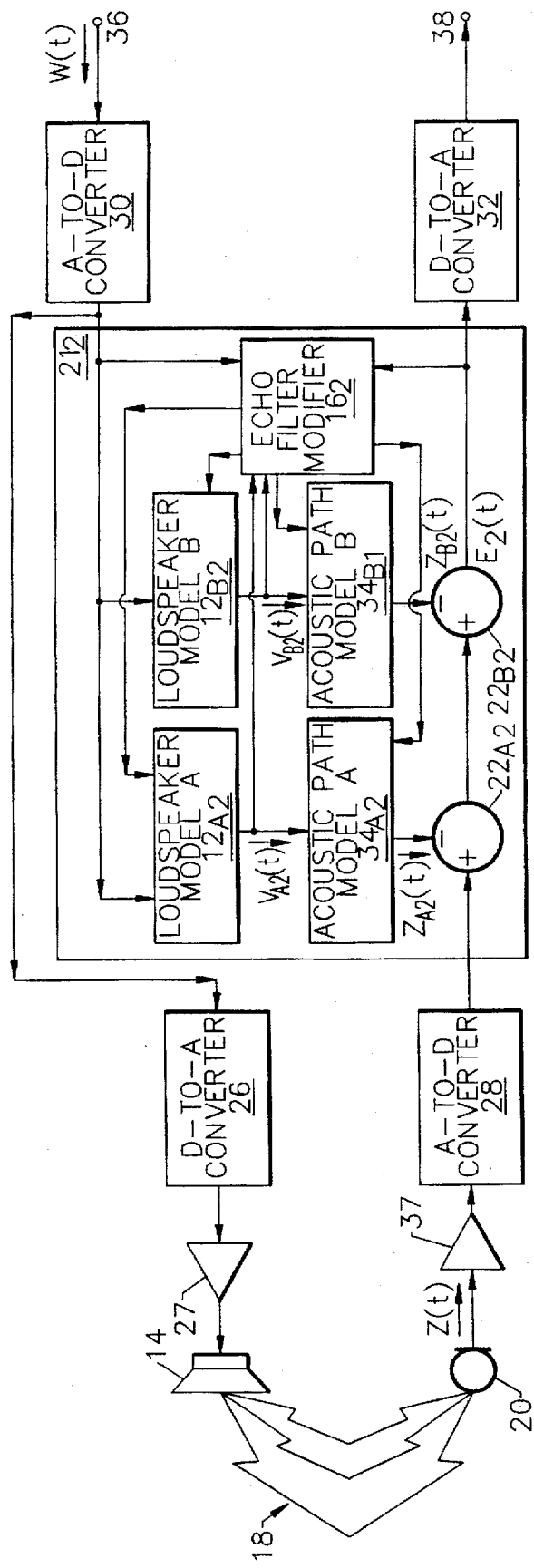
FIG. 4 is a schematic diagram of an echo canceling loudspeaker telephone system including a loudspeaker, a microphone, and an echo filter including two processing blocks to model the loudspeaker and two processing blocks to model the acoustic path, according to the present invention.

In yet another embodiment, the loudspeaker model is broken down into separate processing blocks $12_{A2}$ and $12_{B2}$ within DSP $21_2$, as shown in FIG. 4. Here loudspeaker model A $12_{A2}$ models the non-linear aspects of the sound pressure wave generated by the loudspeaker, and loudspeaker model B $12_{B2}$ models the linear aspects of the sound pressure wave generated by the loudspeaker. This arrangement provides flexibility with regard to the parameters used to characterize the sound pressure wave as well as flexibility with regard to modification of these parameters by echo filter modifier $16_2$.

In this embodiment, the acoustic path model is broken down into multiple processing blocks for modeling the acoustic path for linear and non-linear aspects of the sound pressure wave, as discussed above with regard to FIG. 3. The embodiments of FIGS. 3 and 4 show that the loudspeaker model and the acoustic path model can be broken down into multiple processing blocks in order to model the linear and non-linear aspects of the echo separately. The invention, however, contemplates that these models can be broken down into separate processing blocks in order to model other aspects of the echo separately. For example, separate processing blocks can be provided to model high and low frequency portions of the echo, high and low amplitude portions of the echo, etc.

It has thus been described how a non-linear loudspeaker model 12 of loudspeaker 14 can be obtained and included in the echo cancellation path of a full-duplex loudspeaker telephone in order to obtain better echo cancellation by also canceling non-linear distortion products. The technique can be implemented using a fixed, non-adaptive model of the transducer. The parameters of these non-linearities can be determined by measurement, or the technique can include adaptive determination of the non-linear parameters of the transducer using the techniques described above or variations thereof that can be derived by persons having skill in the art of adaptive signal processing.

Accordingly, many modifications and other embodiments of the invention will come to one skilled in the art having the benefit of the teachings presented in the foregoing descriptions and the associated drawings. Therefore, it is to be understood that the invention is not to be limited to the specific embodiments disclosed, and that modifications are intended to be included within the scope of the appended claims.

That which is claimed is:

1. An echo canceling loudspeaker telephone comprising:

a loudspeaker for producing a sound pressure wave in response to an input signal which is applied to an audio input thereof, said sound pressure wave including a desired linear component which is a linear function of said input signal, and an undesired non-linear component which is a non-linear function of said input signal, said sound pressure wave being transmitted along an acoustic path;

a microphone positioned in said acoustic path for converting said sound pressure wave into an output signal;

an echo filter responsive to said input signal and which generates an estimated echo signal, said echo filter comprising a loudspeaker model which generates an estimate of said sound pressure wave including an estimate of said linear component and an estimate of said non-linear component, and an acoustic path model which generates an estimate of said acoustic path from said loudspeaker to said microphone;

a subtractor for subtracting said estimated echo signal from said output signal thereby reducing an echo portion of said output signal; and an echo filter modifier responsive to said output signal, said input signal and said estimated echo signal which determines a residual echo portion of said output signal remaining after subtracting said estimated echo signal from said output signal, and which modifies estimates of distortions due to said loudspeaker and said acoustic path in response to said residual echo portion to further reduce said echo portion of said output signal;

wherein said loudspeaker model and said acoustic path model are connected in series.

2. An echo-canceling loudspeaker telephone according to claim 1 wherein said echo filter modifier comprises a loudspeaker model modifier for modifying the estimate of said sound pressure wave including said estimate of said linear component and said estimate of said non-linear component.

3. An echo-canceling loudspeaker telephone according to claim 1 wherein said echo filter modifier comprises an acoustic path model modifier for improving the estimate of said acoustic path from said loudspeaker to said microphone.

4. An echo-canceling loudspeaker telephone according to claim 1 wherein said acoustic path model comprises a finite-impulse-response filter.

5. An echo-canceling loudspeaker telephone according to claim 1 wherein said echo filter comprises a digital signal processor.

6. An echo-canceling loudspeaker telephone according to claim 1 wherein said loudspeaker model comprises means for performing a transformation of said input signal, said transformation being an estimate of a transfer function of said loudspeaker, said transfer function including a non-linear component.

7. An echo-canceling loudspeaker telephone according to claim 6 wherein said non-linear component represents one of a delay modulation of said loudspeaker and a diaphragm stress-strain curve of said loudspeaker.

8. An echo canceling loudspeaker telephone comprising:

a loudspeaker for producing a sound pressure wave in response to an input signal which is applied to an audio input thereof, said sound pressure wave including a desired linear component which is a linear function of said input signal, and an undesired non-linear component which is a non-linear function of said input signal, said sound pressure wave being transmitted along an acoustic path;

a microphone positioned in said acoustic path for converting said sound pressure wave into an output signal;

an echo filter responsive to said input signal and which generates an estimated echo signal, said echo filter comprising a loudspeaker model which generates an estimate of said sound pressure wave including an estimate of said linear component and an estimate of said non-linear component, and an acoustic path model comprising a first processing block for generating an estimate of said acoustic path for said non-linear component of said sound pressure wave and a second processing block for generating an estimate of said acoustic path for said linear component of said sound pressure wave; and a subtractor for subtracting said estimated echo signal from said output signal thereby reducing an echo portion of said sound signal.

9. An echo-canceling loudspeaker telephone according to claim 8 further comprising an echo filter modifier responsive to said output signal, said input signal and said estimated echo signal for modifying said echo filter to further reduce said echo portion of said output signal.

10. An echo-canceling loudspeaker telephone according to claim 9 wherein said echo filter modifier comprises an loudspeaker model modifier for modifying the estimate of said sound pressure wave including said estimate of said linear component and said estimate of said non-linear component.

11. An echo-canceling loudspeaker telephone according to claim 9 wherein said echo filter modifier comprises an acoustic path model modifier for improving the estimate of said acoustic path from said loudspeaker to said microphone.

12. An echo-canceling loudspeaker telephone according to claim 8 wherein said acoustic path model comprises a finite-impulse-response filter.

13. An echo-canceling loudspeaker telephone according to claim 8 wherein said echo filter comprises a digital signal processor.

14. An echo-canceling loudspeaker telephone according to claim 8 wherein said loudspeaker model comprises means for performing a transformation of said input signal, said transformation being an estimate of a transfer function of said loudspeaker, said transfer function including a non-linear component.

15. An echo-canceling loudspeaker telephone according to claim 14 wherein said non-linear component represents one of a delay modulation of said loudspeaker and a diaphragm stress-strain curve of said loudspeaker.

16. An echo-canceling loudspeaker telephone comprising:
output transducer means for producing a sound pressure wave in response to an input signal which is applied to an audio input thereof, said sound pressure wave including a desired linear component which is a linear function of said input signal, and an undesired non-linear component which is a non-linear function of said input signal, said sound pressure wave being transmitted along an acoustic path;
input transducer means positioned in said acoustic path for converting said sound pressure wave into a output signal;
echo filter means responsive to said input signal for generating an estimated echo signal, said echo filter means comprising an output transducer model for generating an estimate of said sound pressure wave including an estimate of said linear component and an estimate of said non-linear component, and an acoustic path model for generating an estimate of said acoustic path from said output transducer means to said input transducer means;
combination means for combining said estimated echo signal and said output signal thereby reducing an echo portion of said output signal; and
an echo filter modifier responsive to said output signal, said input signal and said estimated echo signal which determines a residual echo portion of said output signal remaining after subtracting said estimated echo signal from said output signal, and which modifies estimates of distortions due to said loudspeaker and said acoustic path in response to said residual echo portion to further reduce said echo portion of said output signal.

17. An echo-canceling loudspeaker telephone according to claim 16 wherein said echo filter modifier comprises an output transducer model modifier for modifying the estimate of said sound pressure wave including said estimate of said linear component and said estimate of said non-linear component.

18. An echo-canceling loudspeaker telephone according to claim 16 wherein said echo filter modifier comprises an acoustic path model modifier for improving the estimate of said acoustic path from said output transducer to said input transducer.

19. An echo-canceling loudspeaker telephone according to claim 16 wherein said acoustic path model comprises a finite-impulse-response filter.

20. An echo-canceling loudspeaker telephone according to claim 16 wherein said echo filter means comprises a digital signal processor.

21. An echo-canceling loudspeaker telephone according to claim 16 wherein said output transducer means comprises a loudspeaker.

22. An echo-canceling loudspeaker telephone according to claim 16 wherein said input transducer means comprises a microphone.

23. An echo-canceling loudspeaker telephone according to claim 16 wherein said output transducer model and said acoustic path model are connected in series between said audio input and said combination means.

24. An echo-canceling loudspeaker telephone according to claim 16 wherein said combination means comprises a subtractor for subtracting said estimated echo signal from said output signal.

25. An echo-canceling loudspeaker telephone according to claim 16 wherein said output transducer model comprises means for performing a transformation of said input signal, said transformation being an estimate of a transfer function of said output transducer means, said transfer function including a non-linear component.

26. An echo-canceling loudspeaker telephone according to claim 25 wherein said non-linear component represents one of a delay modulation of said output transducer means and a diaphragm stress-strain curve of said output transducer means.

27. An echo-canceling loudspeaker telephone comprising:
output transducer means for producing a sound pressure wave in response to an input signal which is applied to an audio input thereof, said sound pressure wave including a desired linear component which is a linear function of said input signal, and an undesired non-linear component which is a non-linear function of said input signal, said sound pressure wave being transmitted along an acoustic path;
input transducer means positioned in said acoustic path for converting said sound pressure wave into a output signal;
echo filter means responsive to said input signal for generating an estimated echo signal, said echo filter means comprising an output transducer model for generating an estimate of said sound pressure wave including an estimate of said linear component and an estimate of said non-linear component, and an acoustic path model for generating an estimate of said acoustic path from said output transducer means to said input transducer means; and
combination means for combining said estimated echo signal and said output signal thereby reducing an echo portion of said output signal;
wherein said acoustic path model comprises a first processing block for generating an estimate of said acoustic path for said non-linear component of said sound pressure wave and a second processing block for generating an estimate of said acoustic path for said linear component of said sound pressure wave.

28. A method for reducing echoes in a telephone system including a loudspeaker, said method comprising the steps of:
applying an input signal to said loudspeaker to produce a sound pressure wave which is transmitted along an acoustic path, said sound pressure wave including a desired linear component which is a linear function of said input signal and an undesired non-linear component which is a non-linear function of said input signal;
converting said sound pressure wave in said acoustic path to produce an output signal including an echo portion;
generating an estimated echo signal in response to said input signal, wherein said estimated echo signal includes an estimate of distortions due to said loudspeaker which includes linear and non-linear components, and an estimate of distortions due to said acoustic path; and
combining said output signal and said estimated echo signal to reduce said echo portion of said output signal;

wherein said combining step is followed by the steps of determining a residual echo portion of said output signal remaining after said combining step, and modifying said estimates of distortions due to said loudspeaker and said acoustic path in response to said residual echo portion to further reduce said echo portion of said output signal.

29. A method according to claim 28 further comprising the step of comparing said input signal with said output signal to determine when said output signal substantially comprises only said echo portion, and wherein said modifying step is performed when said output signal substantially comprises only said echo portion.

30. A method according to claim 29 wherein said input signal comprises an input test signal.

31. An echo canceling loudspeaker telephone comprising:

a loudspeaker for producing a sound pressure wave in response to an input signal which is applied to an audio input thereof, said sound pressure wave including a desired linear component which is a linear function of said input signal, and an undesired non-linear component which is a non-linear function of said input signal, said sound pressure wave being transmitted along an acoustic path;

a microphone positioned in said acoustic path for converting said sound pressure wave into an output signal;

an echo filter responsive to said input signal and which generates an estimated echo signal, said echo filter comprising a loudspeaker model which generates an estimate of said sound pressure wave including an estimate of said linear component and an estimate of said non-linear component, and an acoustic path model which generates an estimate of said acoustic path from said loudspeaker to said microphone; and a subtractor for subtracting said estimated echo signal from said output signal thereby reducing an echo portion of said output signal;

wherein said loudspeaker model and said acoustic path model are connected in series; and wherein said acoustic path model comprises a first processing block for generating an estimate of said acoustic path for said non-linear component of said sound pressure wave and a second processing block for generating an estimate of said acoustic path for said linear component of said sound pressure wave.

* * * * *